United States Patent [19]

Newman et al.

[11] Patent Number: 6,005,547
[45] Date of Patent: Dec. 21, 1999

[54] CALIBRATION OF AN INTERACTIVE DESKTOP SYSTEM

[75] Inventors: William M. Newman; Quentin Stafford Fraser; Richard M. Bentley, all of Cambridge, United Kingdom

[73] Assignee: Xerox Corporation, Stamford, Conn.

[21] Appl. No.: 08/713,490

[22] Filed: Sep. 13, 1996

[30] Foreign Application Priority Data

Oct. 14, 1995 [GB] United Kingdom ............... 9521072

[51] Int. Cl.[6] ........................................... G09G 5/00
[52] U.S. Cl. ..................... 345/156; 395/106; 707/530
[58] Field of Search ................................ 345/1, 113–115, 345/156–158, 173–178; 395/333; 358/93, 471, 464, 475; 350/208.1, 222.1; 364/552; 382/8, 22, 48

[56] References Cited

U.S. PATENT DOCUMENTS

| | | | |
|---|---|---|---|
| 4,468,694 | 8/1984 | Edgar | 358/93 |
| 4,776,027 | 10/1988 | Hisano et al. | 382/48 |
| 4,807,296 | 2/1989 | Ando et al. | 382/8 |
| 5,019,917 | 5/1991 | Hata et al. | 558/448 |
| 5,025,314 | 6/1991 | Tang et al. | 358/93 |
| 5,084,611 | 1/1992 | Okisu et al. | 250/208 |
| 5,140,646 | 8/1992 | Ueda | 382/22 |
| 5,163,012 | 11/1992 | Wuhrl et al. | 364/552 |
| 5,194,729 | 3/1993 | Okisu et al. | 250/222.1 |
| 5,377,019 | 12/1994 | Okisu et al. | 358/464 |
| 5,416,609 | 5/1995 | Matsuda et al. | 358/474 |
| 5,436,639 | 7/1995 | Arai et al. | 345/156 |
| 5,511,148 | 4/1996 | Wellner | 395/106 |
| 5,585,926 | 12/1996 | Fujii et al. | 358/471 |
| 5,616,914 | 4/1997 | Matsuda | 250/208.1 |
| 5,677,776 | 10/1997 | Matsuda et al. | 358/475 |
| 5,732,227 | 3/1998 | Kuzunuki et al. | 395/333 |

FOREIGN PATENT DOCUMENTS

| | | |
|---|---|---|
| 0495622 | 7/1992 | European Pat. Off. . |
| 0568161 | 11/1993 | European Pat. Off. . |
| 0 626 636 A2 | 11/1994 | European Pat. Off. . |
| 0622722 | 11/1994 | European Pat. Off. . |

OTHER PUBLICATIONS

Newman, W., Wellner, P., "A Desk Supporting Computer-based Interaction with Paper Documents" Chi '92, May 3–7, 1992, Monterey, pp. 587–592.

Wellner, P.,, "DigitalDesk" 8070 Communications of the ACM 36 (1993) Jul. No. 7, New York, US, pp. 87–96.

*Primary Examiner*—Matthew Luu
*Assistant Examiner*—Jeff Piziali
*Attorney, Agent, or Firm*—Richard B. Domingo

[57] ABSTRACT

An interactive desktop system comprising a work surface, a display device such as a projector for displaying images in a first area on the work surface, a camera for capturing images in a second area on the work surface, and an image processor, coupled to the display device and to the camera, said image processor being suitably programmed (a) for causing the display of barcodes on the work surface, (b) for causing the capture of said barcodes and, in dependence on the captured information, (c) for determining the position of said second area relative to said first area. The barcodes are displayed in a horizontal then vertical orientation, with an image capture in each display orientation being performed by the camera. This enables the camera's field of view within the displayed image to be determined. In an alternative embodiment, glyph codes may be used instead of barcodes.

14 Claims, 8 Drawing Sheets

CALIBRATION OF AN INTERACTIVE DESKTOP SYSTEM

FIELD OF THE INVENTION

The invention relates to a document processing system in which a user manipulates documents interactively via a camera-projector arrangement, and more particularly to the calibration of the camera's field of view with the projection display.

BACKGROUND OF THE INVENTION

It is known from EP-A-495 622 to use a camera-projector arrangement positioned above a desk, in order to enable a user to select functions to be performed by selecting items located within the field of view of the camera. A video camera or scanner is used to capture images of documents on a desk, and feedback information is displayed by means of a projection display. The functions include calculating and translating operations carried out on data (e.g., in a paper document) located on the desk. In such a system, camera and display must be kept in registration, and this involves calibration whenever the camera's field of view changes with respect to the display.

By way of example, when the user selects a word in a document, feedback must be displayed to confirm the selection, aligned precisely with the word. The position of the displayed information can be calculated if the size, orientation and position of the camera's field of view are known, relative to the display coordinate system.

Previous proposals for solving this calibration problem have used calibration marks projected onto the work surface. EP-A-622,722 discloses a calibration system which projects a thick cross or "plus" sign (+), and uses image morphology (see D. Bloomberg & P. Maragos, "Image Algebra and Morphological Image Processing", SPIE Conference Procs, San Diego, Calif., July 1990) to pinpoint the center of the mark in the frame grabber coordinate space. A cross (+) is projected at four successive points; and to calculate the mapping from the four points the techniques uses the following equations (see FIG. 4 of EP-A-622,722), $$x' = c_1 x + c_2 y + c_3 xy + c_4$$

$$y' = c_5 x + c_6 y + c_7 xy + c_8$$

where (x,y) are coordinates in the projected display, and (x',y') are coordinates in the frame grabber. With four point pairs, the set of simultaneous linear equations can be solved by Gaussian Elimination. Then, a fifth cross (+) is projected and its location is checked to make sure it is close enough to the position produced by the mapping. While this process deals with the keystoning and rotation effects caused by lack of alignment of the camera to the display, and the result is accurate to within one or two display pixels, it requires the user manually to specify the rough position of the camera's field of view, and is thus inappropriate for situations where the field of view is constantly or frequently changing.

There is therefore a need for a calibration technique which can be performed rapidly and automatically whenever the field of view changes. There is also a need for a calibration technique which is effective even when the work surface is cluttered with documents lying within the field of view of the camera. And there is also a need for a calibration technique which can cope with a wide range of fields of view.

SUMMARY

The present invention provides an interactive desktop system comprising a work surface, a means for displaying images in a first area on the work surface, means for capturing images in a second area on the work surface, and processor means, coupled to the displaying and capturing means, said processor means including means (1) for causing the display of coded information on the work surface, (2) for causing the capture of said coded information and, in dependence on said captured coded information, (3) for determining the position of said second area relative to said first area.

Preferably, the displaying means comprises a projector and the capturing means comprises a camera.

An advantage is that the invention is that it does not require manual intervention by the user to position the calibration display under the camera's field of view. Therefore, it is suitable for automatic calibration, invoked when the field of view is adjusted by the application.

A further advantage is that it only requires the display and grabbing of three successive image frames, whereas previous techniques may require five (four corner displays and a final accuracy check); and this makes the techniques faster.

A yet further advantage is that the technique works reliably even when the work surface is covered with documents. This avoids the need for the user to clear his desk during calibration and, again, makes it possible to calibrate automatically (and periodically) while paperwork is in progress.

Embodiments of the invention will now be described, by way of example, with reference to the accompanying drawings, in which:

DETAILED DESCRIPTION OF THE INVENTION

A. Basic System

Figure 1:
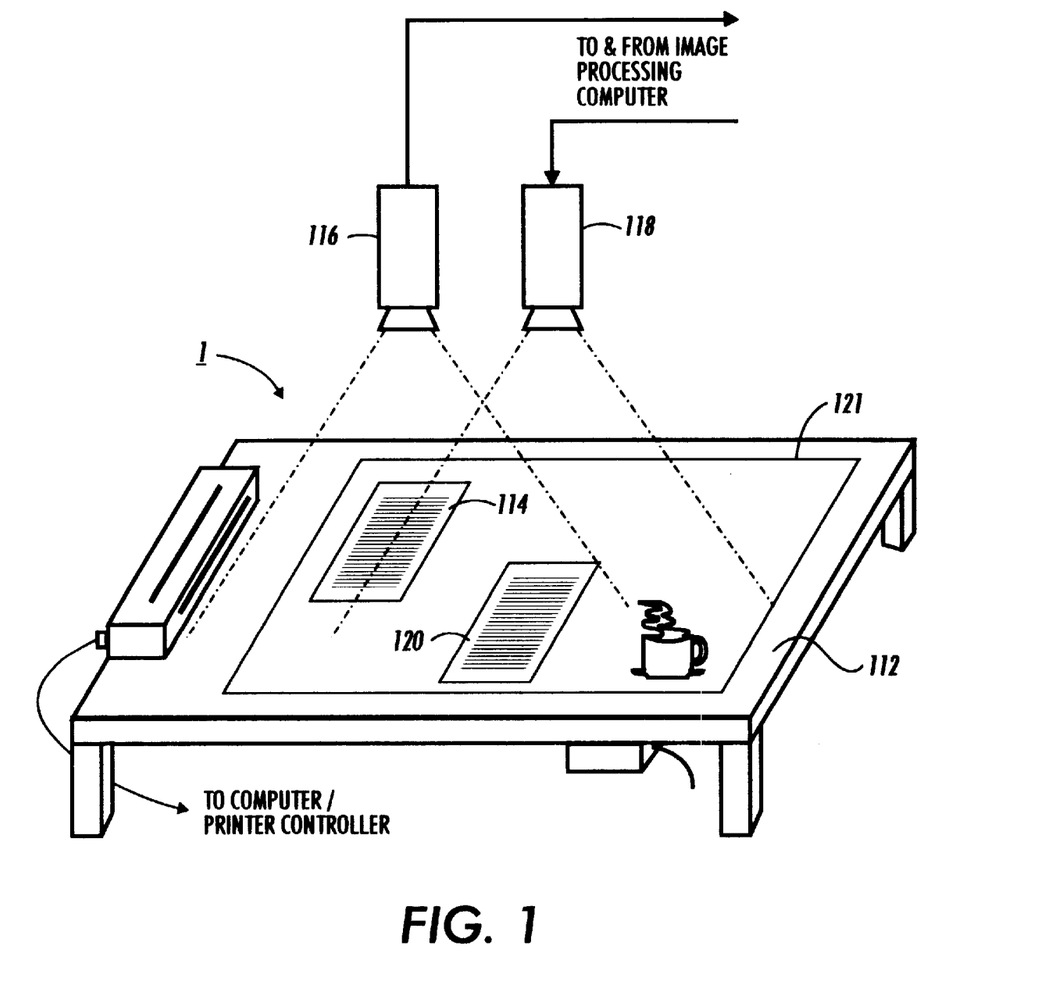
FIG. 1 shows a view of the overall system according to one embodiment of the invention.

The general system configuration according to the invention, employing a video camera 116 and projector 118 positioned above and focused on a work surface 112, is illustrated in FIG. 1.

The flat desk surface 112 has placed on it a document 114 to be used as a source if textual or graphical information during manipulations, as described in U.S. Pat. No. 5,511,148, which is assigned to the same assignee as the present application and which is incorporated herein by reference. The document 114 is located within the field of view of a video camera 116 mounted above the desk surface 112. A video projector 118 is mounted adjacent the camera 116 and projects onto the surface 112 a display 121 which is generally coincident with the field of view of the camera 116, and which, in the example shown, includes an image of a newly created document 120. The camera 116 and the projector 118 are both connected to an image processing system (not shown), which may be, for example, a computer having a standard microcomputer (PC) architecture; this is discussed in more detail below with reference to FIG. 2.

It will be appreciated by persons skilled in the art that the invention may be implemented using a computer running Windows™ and equipped with a frame grabber board and appropriate interfacing circuitry (see, for example, Jähne B., *Digital Image Processing*, Appendix B, Springer-Verlag, Heidelberg, 1991).

Alternatively, the hardware configuration described in detail in U.S. Pat. No. 5,511,148 may be employed.

In implementing the present invention, image processing techniques described in U.S. Pat. No. 5,511,148 may be used, modified as appropriate and/or as described below.

The computer is coupled to a network cable 16, which in conjunction with a conventional internal driver card (not shown) and appropriate software (such as Netware, available from Novell Corp.) enable the computer to form part of a local (LAN) or wide area network (WAN), as is well known in the art.

Figure 2:
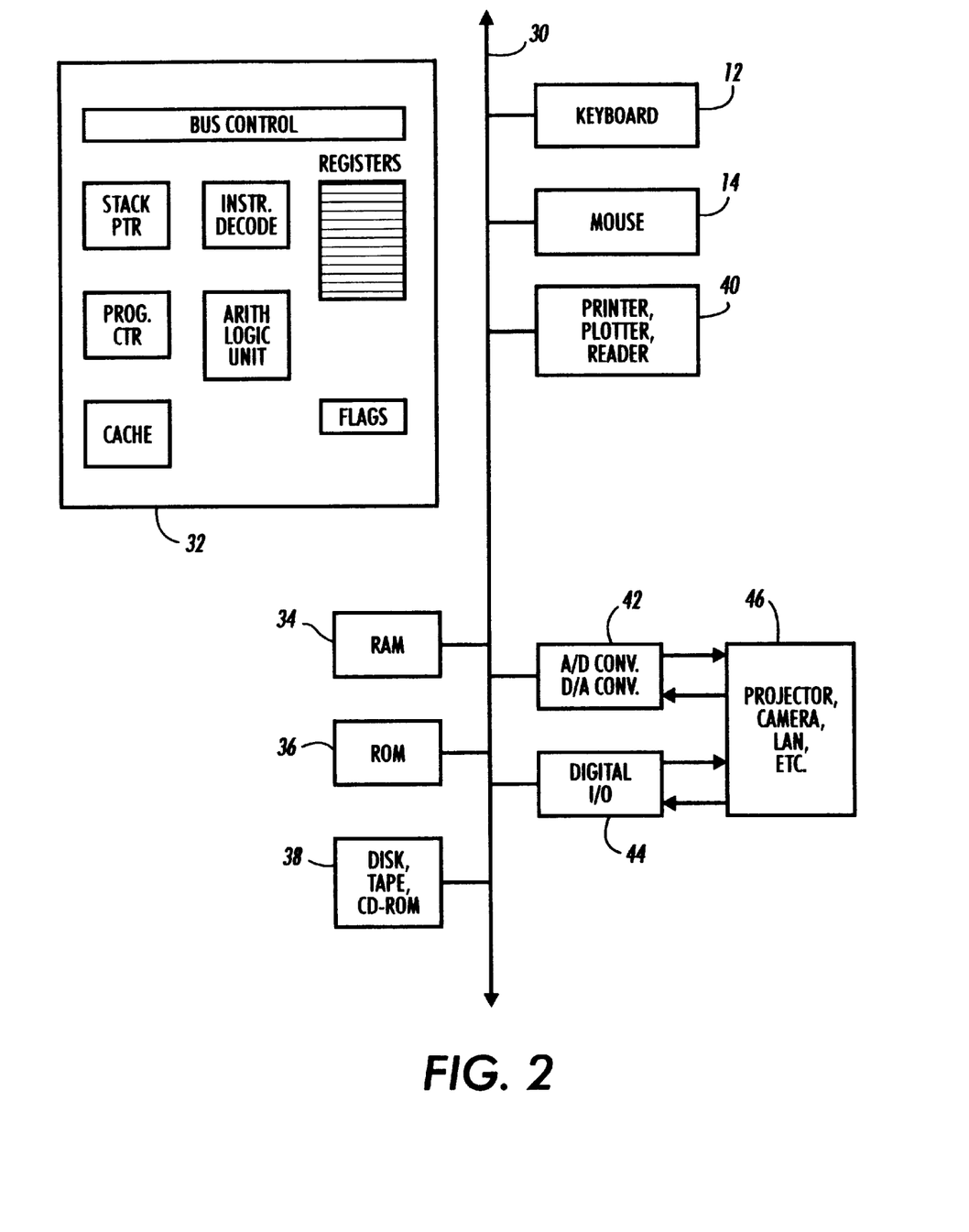
FIG. 2 is a schematic block diagram of the computer used in the system of FIG. 1.

The hardware of the image processing computer employed in accordance with one preferred embodiment of the invention is schematically shown in FIG. 2. The configuration is well known to persons skilled in the art and, for example, is described in detail in *The Art of Electronics*, 2nd Ed., Ch. 10, P. Horowitz and W. Hill, Cambridge University Press, 1989. Stated briefly, the system comprises, connected to common bus 30, a central processing unit 32, memory devices including random access memory (RAM) 34, read only memory (ROM) 36 and disk, tape or CD-ROM drives 38, keyboard 12, mouse 14, printing, plotting or scanning devices 40, and A/D, D/A devices 42 and digital input/output devices 44 providing interfacing to external devices 46 such as camera 116, video projector 118 and the rest of the LAN (not shown).

B. Automatic Calibration

According to a preferred embodiment of the invention, the position of the camera's field of view is determined automatically, wherever it may lie in the area covered by the display. This is achieved by displaying a form of barcode, and then grabbing an image of the barcodes via the camera. The grabbed images of the barcodes are analyzed to determine where the camera is looking. In the time it takes to display and grab three successive images (a blank display and two sets of barcodes) and to perform the analysis, the camera and projection display can be calibrated without intervention from the user, irrespective of whether the desk is clear or cluttered with documents. The displayed barcodes are different in design to those used in labeling products.

Figure 3:
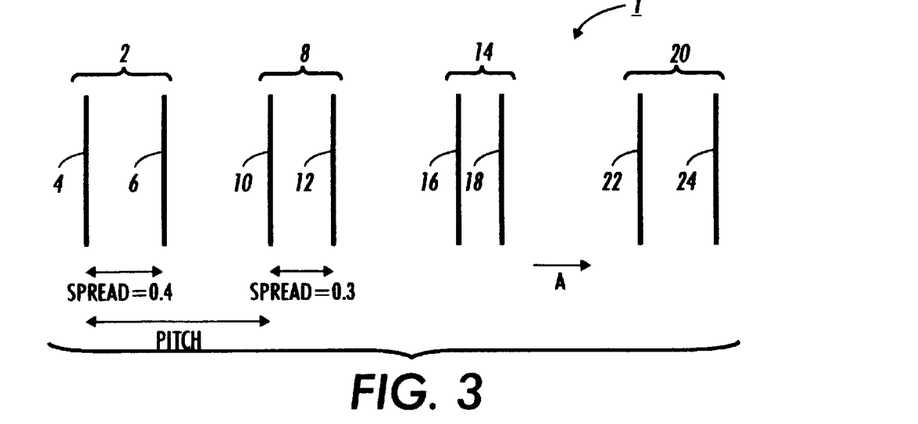
FIG. 3 shows a set of four groups of bars projected onto a surface in one embodiment of the invention.

Referring to FIG. 3, this shows the barcode 1 employed in one embodiment of the invention, which comprises four groups 2,8,14,20 of bars 4,6,10,12,16,18,22,24 projected onto a surface. The bars may be of differing thicknesses, e.g. 1 or 2 pixels wide. The distance from the bar (e.g. 4) at the start of one group to the bar (e.g. 10) at the start of the next group is fixed and is referred to as the pitch of the barcode 1. The distance from the first bar of a group to the last bar, expressed as a fraction of the pitch, is called the spread of the group of bars. In this embodiment, the spread can vary from group to group, but is always less than 0.5. this enables the start of each group to be detected.

According to this technique, a sequence of groups of bars are used in which the spread varies in a recognizable sequence. The camera grabs a portion of the displayed image, and the pixels values along one scanline (see FIG. 5, discussed below), perpendicular to the bars, are examined. If the bars can be found in this scanline, and these bars can be formed into groups, the spread of the latter can be matched up with the spreads in the displayed pattern.

Figure 4:
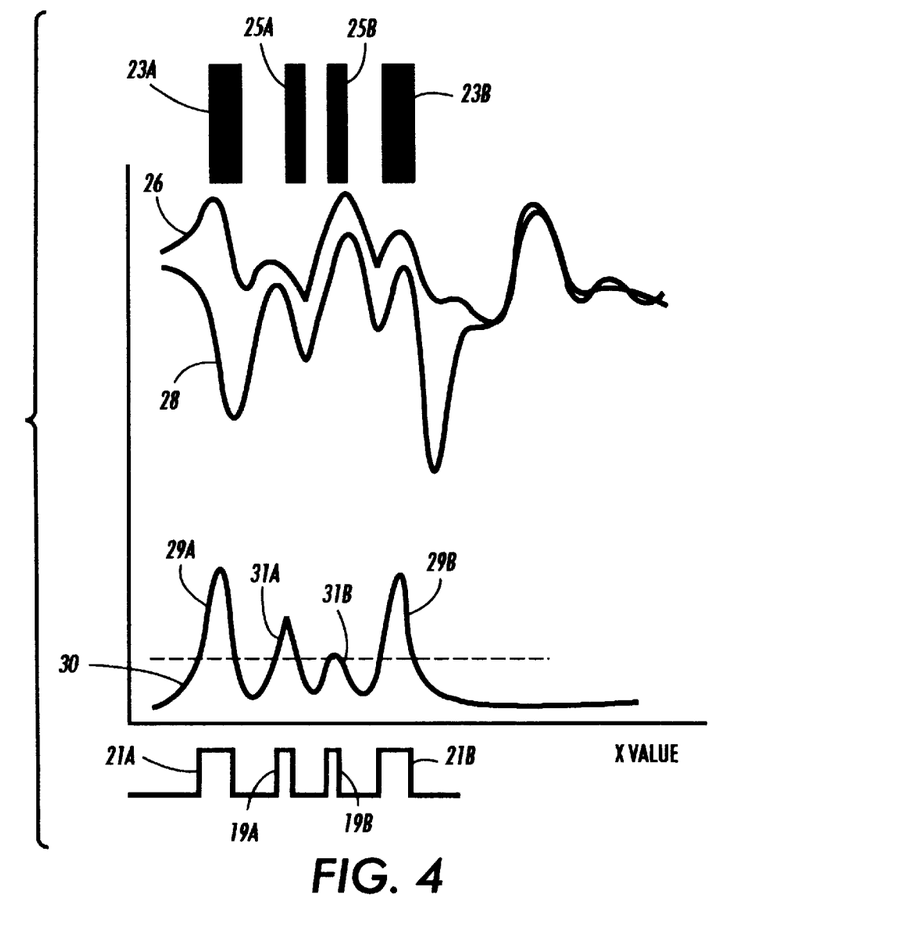
FIG. 4 shows a plot of pixel values along a scanline, showing the effect of displaying the bars on a complex background.

Turning to FIG. 4, this shows a plot of pixel values along a scanline, showing the effect of displaying the bars on a complex background. After the blank frame has been projected and grabbed, a frame is first projected with a barcode 1 extending (in the direction of arrow A) from left to right across the display, with the bars of the barcode 1 spanning the full height of the display so that substantially the entire display is filled by the barcode 1. While this barcodes is being projected, a frame is grabbed via the camera. Then, this step is repeated with a projected barcode in an orthogonal orientation (bars horizontal and spanning the full width of the display). By using a set of three displays and grabs, the interfering affect of documents lying on the desk can be largely eliminated. The pixels values from the second and third grabs (vertical and horizontal bars) are subtracted from the values from the first grab(blank display), to produce a set of pixel difference values caused by the bars themselves. In FIG. 4, trace 26 shows pixel value vs. position along a scanline for the image grabbed with the blank display, trace 28 shows pixel value vs. position along a scanline for the image grabbed with the barcode displayed, and trace 30 shows the difference, in which the two major peaks indicate the positions of the two thick bars in a group.

The traces 26–30 show the smoothing effect of sampling. The trace 30 is preferably thresholded at a value of half the maximum value for the trace, so that the outer peaks 29a, 29b produce two outer broad square pulses 21a, 21b corresponding to thick bars 23a,23b, and the inner peaks 31a, 31b produce two inner thin square pulses 19a, 19b corresponding to thin bars 25a,25b.

Figure 5A:
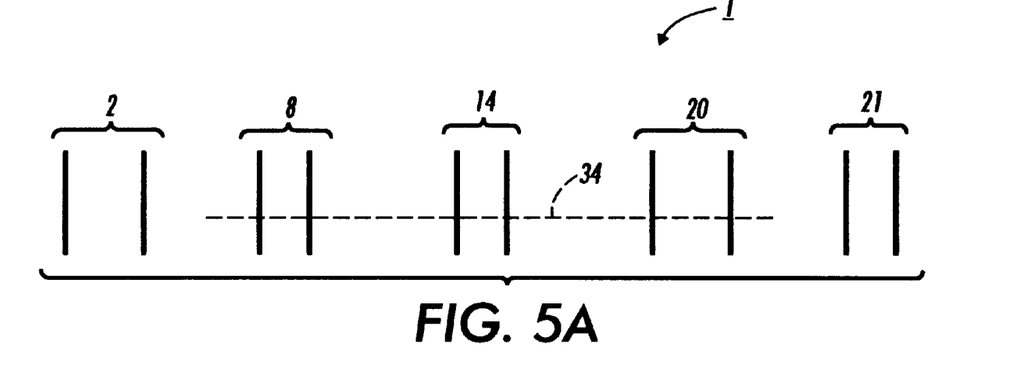
FIG. 5(a) illustrates a set of displayed barcodes.
Figure 5B:
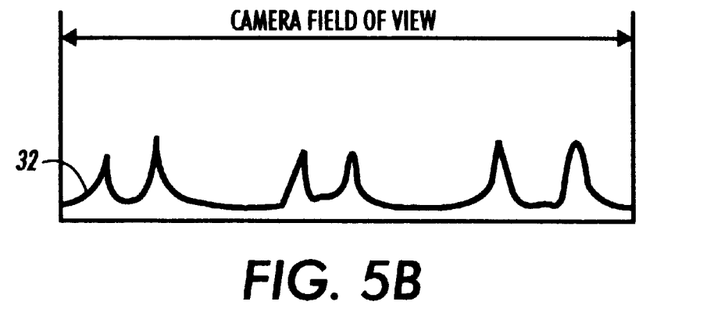
FIG. 5(b) illustrates the resulting differenced pixel values along a scanline.

FIG. 5 illustrates (a) a displayed barcode comprising a sequence of groups 2,8,14,20,21, a subset (8,14,20) of which are visible to the camera. Also shown (FIG. 5 (*b*)) is the trace of differenced pixel values along a scanline 34 within the field of view and perpendicular to the bars. The pitch of the barcode pattern 1 can easily be determined, because the gap before each leading bar (4,10,16,22) of a group is always wider than the width of the following group. The widths of the groups can be found, and by comparing these widths with the pitch it is possible to compute the spread of the group that generated the pair of peaks in the grabbed image. The sequence of spreads in the grabbed image can be matched up with the displayed sequence of spreads, and the location of the former can be found in the latter sequence. This indicates which part of the sequence lies within the camera's field of view.

Figure 6:
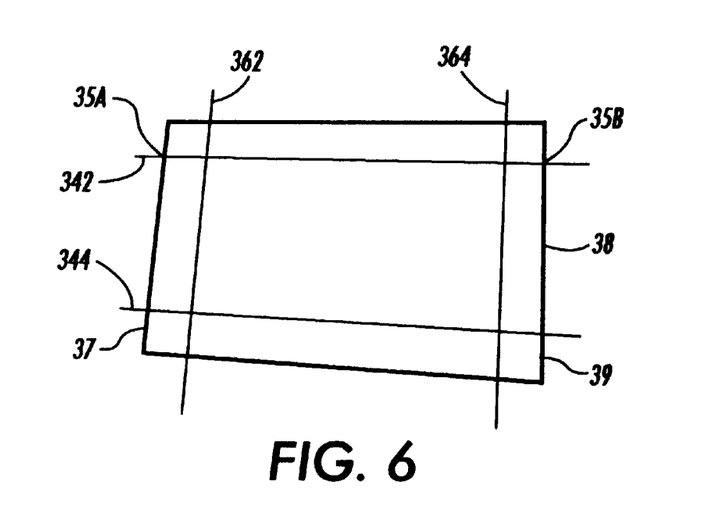
FIG. 6 is an illustration of the four scanlines employed in one embodiment of the invention.

The same technique is applied to the barcodes displayed in the third frame, so as to determine the camera's position in the orthogonal direction. FIG. 6 illustrates how this is accomplished: the techniques is applied twice in each direction, along scanlines 342, 344 and 362,364 close to the edge of the camera's field of view 38 (the distances from the edges are exaggerated in FIG. 6). Each application of the technique generates the coordinates of the two intersections (e.g. 35a,35b) of the scanline (e.g. 342) with the edges (e.g. 37,39) of the field of view. The intersections along each edge are extrapolated, and the location where pairs of extrapolated perpendicular edges can be found, so as to locate the corner of the field of view 38. In this way, four points in the display coordinates can be calculated corresponding to the corners of the camera's field of view 38.

In order to overcome reliability problems which may be encountered with the above-described technique, an alternative embodiment employs a two-level coding scheme which has proved to be successful. The problems may arise from lack of accuracy in measuring the spread of groups of bars in the grabbed image. For example, two groups of bars, with spreads of 0.3 and 0.4, may not be possible to distinguish when the field of view is large, due to noise and sampling errors. If a range of different spreads (e.g., 0.05, 0.15, 0.25, 0.35 and 0.45) are used to construct the barcode display, there will be too many errors in measuring spreads in the grabbed image. If a smaller range of spreads is used, e.g. the spreads of 0.2 and 0.4, this problem is solved because the difference in widths of groups is indistinguishable whatever the field of view. Thus the camera may grab a sequence (e.g., 0.2, 0.4, 0.2) that occurs several times in the displayed sequence. This problem prevents the technique from being used across a wide range of field of view.

Various multi-pass techniques can be devised to overcome this problem, but in this alternative embodiment of the invention it is solved in just a single pass, using just three displayed images (blank display, vertical bars, horizontal bars).

Figure 7A:
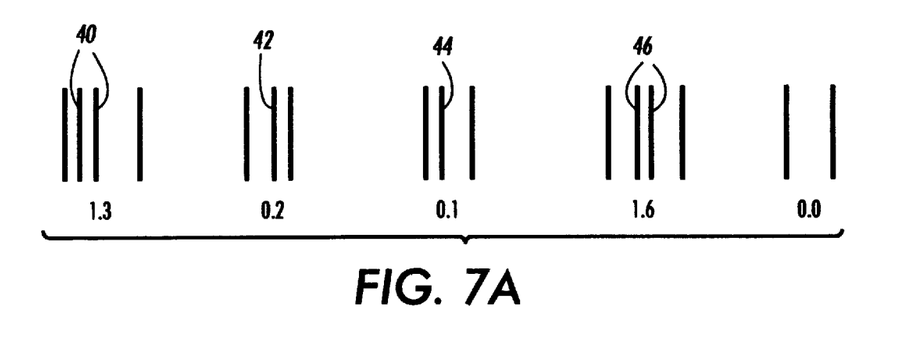
FIG. 7(a) shows an alternative embodiment of the invention, in which fractional bars are employed within the groups.
Figure 7B:
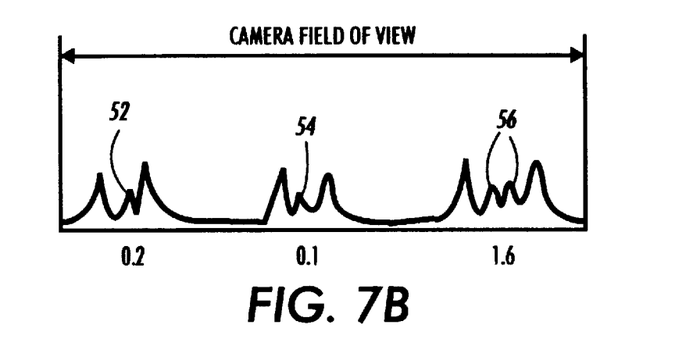
FIGS. 7(b) and 7(c) show plots of pixel values along a scanline for narrow and wide fields of view, respectively.
Figure 7C:
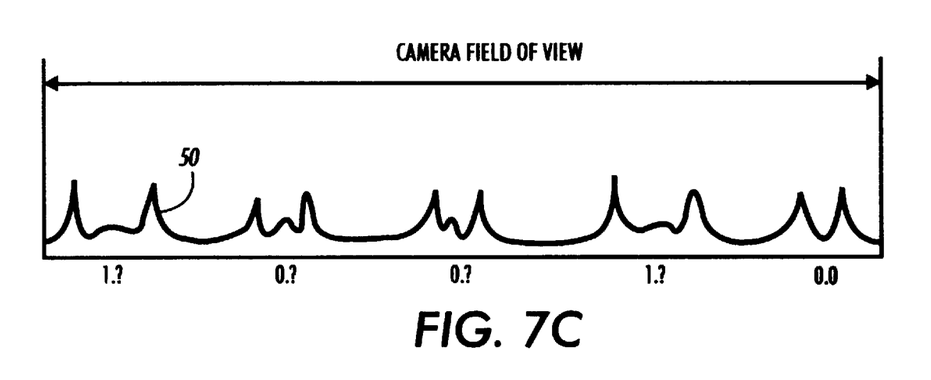

FIG. 7 illustrates the technique: just two different spreads are used, but with extra, fractional bars 40–46 displayed (see FIG. 7(a)) between the leading and trailing bars of each group. These bars 40–46 form a binary code (i.e. extra peaks 52–56 in the trace 48 of pixel difference values) that can be easily detected at small fields of view (FIG. 7(b)), i.e. in situations where the spread alone is insufficient to overcome ambiguity. At large fields of view (FIG. 7(c)) the fractional bars 40–46 are no longer distinguishable in the trace 50 of pixel difference values, but here the spread values are sufficient to identify the visible portion of the displayed sequence.

FIG. 8 is a schematic flow diagram of the data processing steps employed in the calibration technique according to the invention. FIG. 8(a) shows the basic sequence of steps. Firstly an all white frame is displayed (step s1), and the camera grabs (step s2) the all white image. At step s3 the barcode with all vertical bars is displayed, and at step s4 this image is grabbed by the camera. Then, at step s5 the barcode with the all-horizontal bars is projected, and at step s6 this image is grabbed by the camera. Finally, the system computes the field of view at step s7.

Figure 8A:
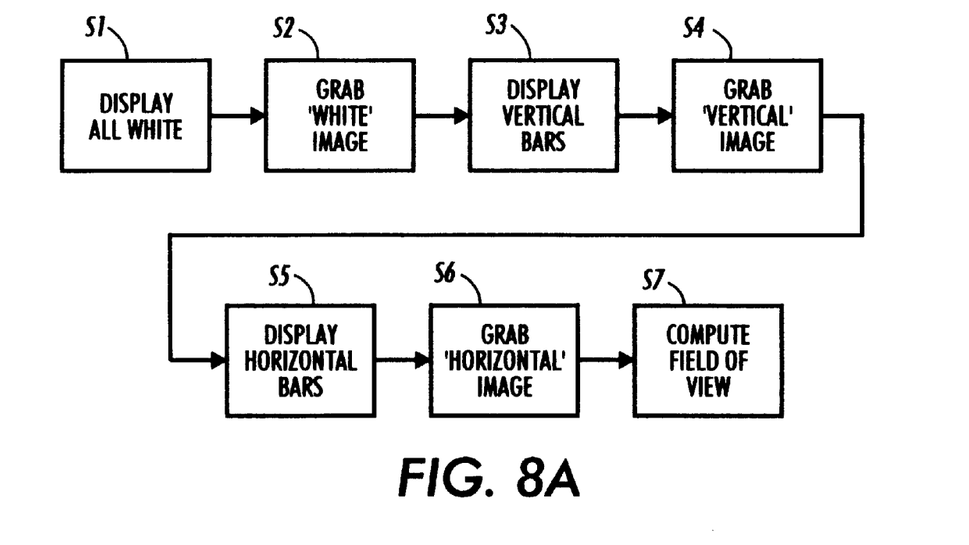
FIGS. 8(a)–(e) are schematic flow diagrams of the data processing steps employed in the calibration technique according to the invention.
Figure 8B:
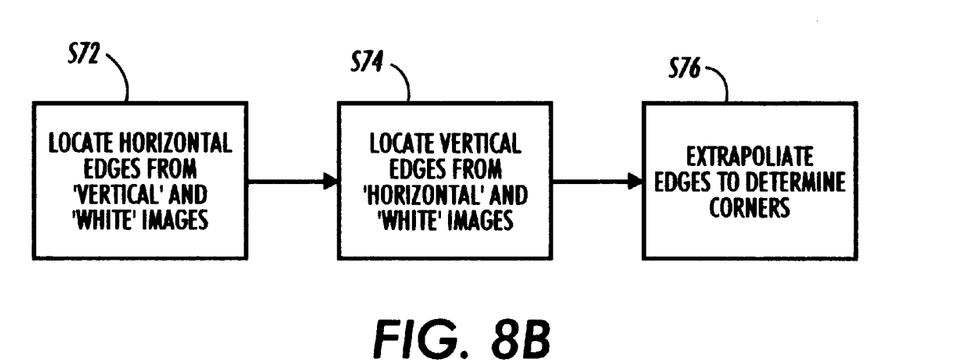

FIG. 8(b) illustrates the substeps in the step (S7) of computing the field of view: step s72 locates the horizontal edges from the grabbed images of the vertical bars and the all-white image; step s74 locates the vertical edges of the field of view from the grabbed images of the horizontal bars and the all-white image; and at step s76 the edges are extrapolated to determine the positions of the corners of the camera's field of view.

Figure 8C:
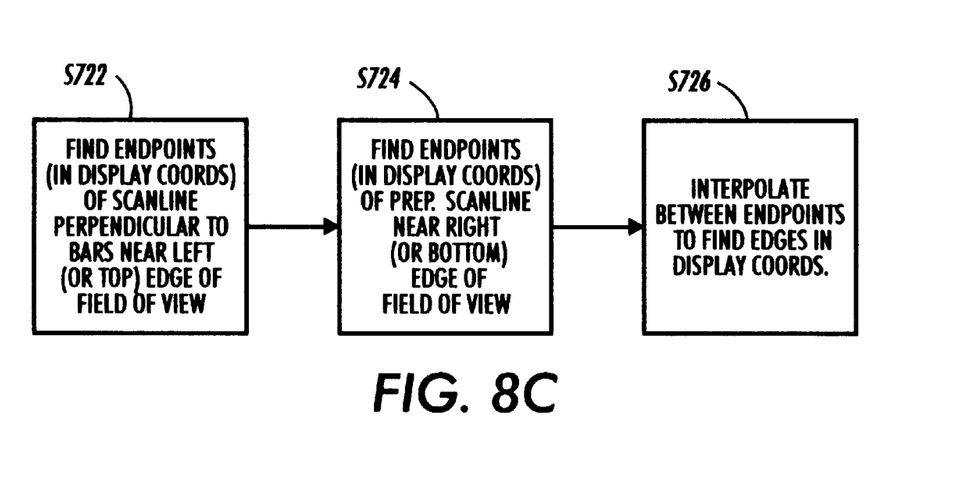

FIG. 8(c) shows the substeps in the step S72 (and S74) of locating horizontal edges from 'vertical' ('horizontal') and 'white' images. First, the system finds the endpoints (in the display coordinates) of the scanline near the left (or top) edge of the field of view (step s722). Next, the system finds the endpoints (in the display coordinates) of the scanline near the right (or bottom) edge of the field of view (step s724). Finally, at step s726, the system interpolates between endpoints to find edges in the display coordinates.

Figure 8D:
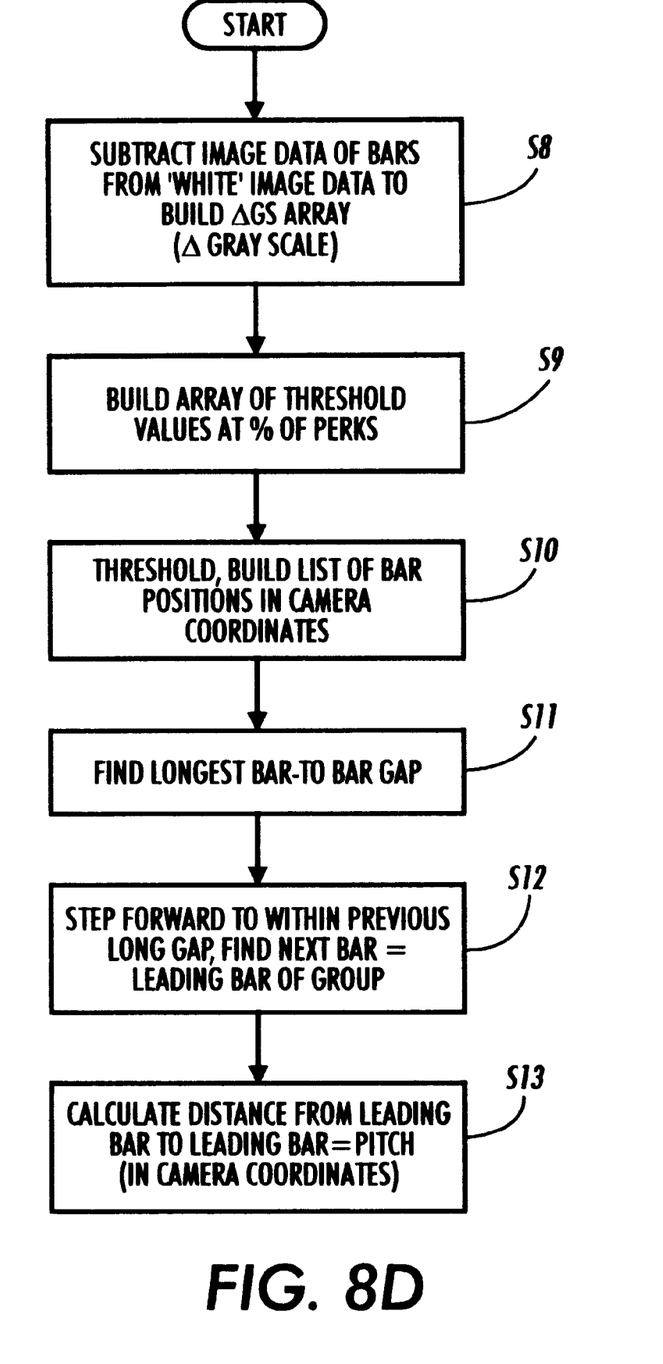
Figure 8E:
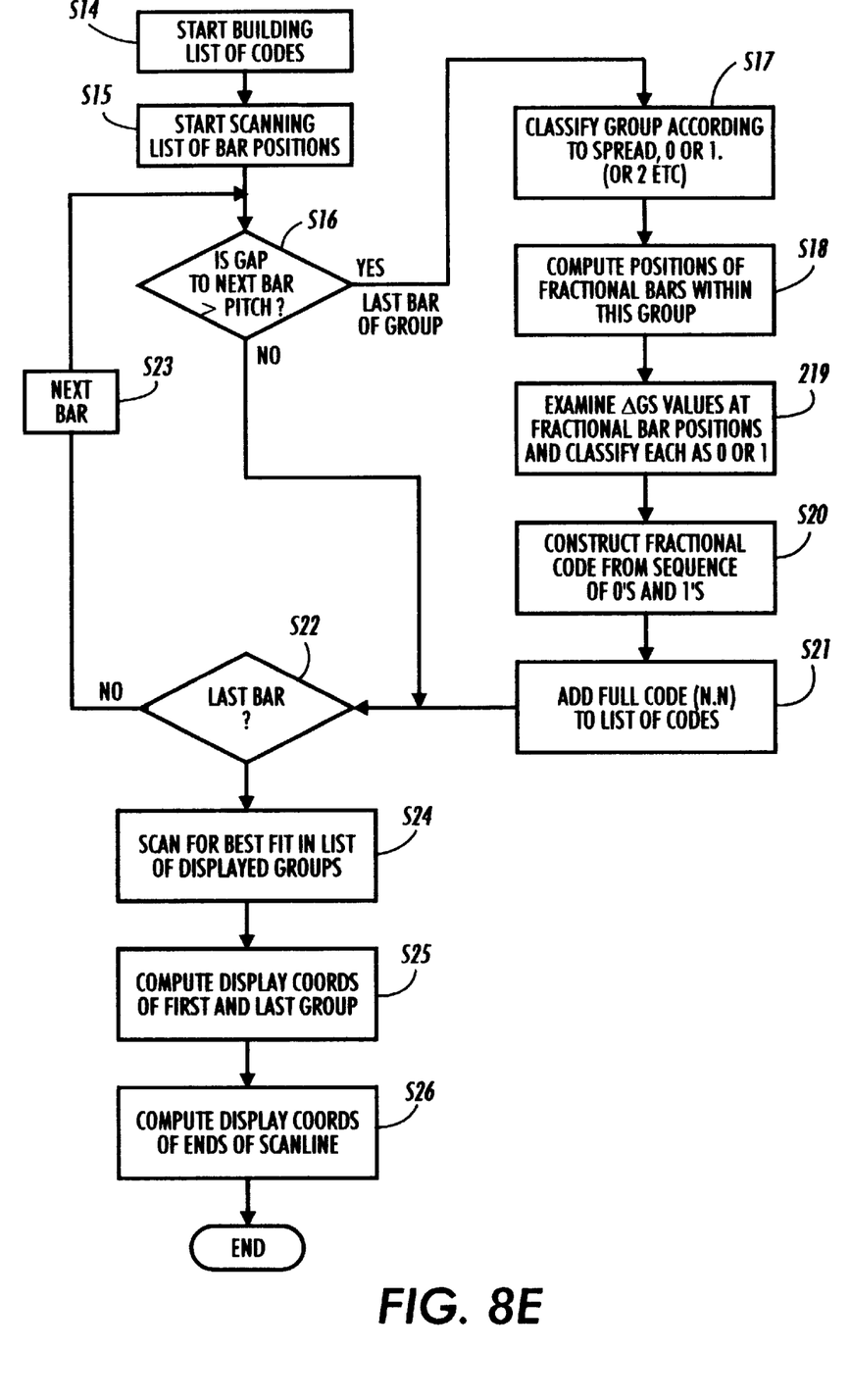

FIGS. 8(d) and (e) illustrate the substeps in the step of finding the endpoints (in the display coordinates) of the scanline perpendicular to the bars. At step s8 the system subtracts the image data resulting from the displayed bars from the 'white image' data to build a GS ( grayscale) array. Next an array of threshold values at % of peaks is built (step s9). Then, a threshold operation is performed, and a list built of bar positions in the camera coordinates (step s10). The system then finds the longest gap between successive bars (step s11). Next, a step forward is performed to within the previous long gap, and the next bar (=leading bar of group) thus found (step s12). At step s13, the distance from leading bar to next leading bar (=pitch) is calculated (in the camera coordinates).

Next, as illustrated in FIG. 8(e), the system commences a routine to build a list of codes (s14). At step s15, the scanning of the list of bar positions determined in routine of FIG. 8(d) is started. For each such position, it is determined (step s16) whether the gap to the next bar has a value greater than the (already known) pitch distance.

In the event of a positive determination in step s16, this means that the last bar in the group is being processed, and the next step is for the group to be classified according to the characteristic spread —0, or 1 (or 2, etc.). Then, for this group, the positions of the fractional bars within the group are calculated (step s18), followed by an examination of the ΔGS values at the fractional bar positions, and classification of each of the latter as 0 or 1 (step s19). Next, an operation is performed to construct a code—a fractional code—from the sequence of 0s and 1s previously derived (step s20). Once the full code (N,N) has been constructed, it is then added (step s21) to the list of codes being compiled. The processing then continues to step s22.

In the event of a negative determination at step s16, the processing jumps to step s22.

At step s22, a check is made of whether the last bar within the field of view has been reached, and if not, attention moves (step s23) to the next bar, and the processing returns to step s16.

If, on the other hand, it is determined at step s22 that the last bar has been reached, the next step is for a scan to be made (step, s24) to obtain the best fit in the list of displayed groups. Then, once the best fit is obtained, at step s25 the display coordinates of the first and last groups is computed. This enables the display co-ordinates for the two ends of the scanline to be calculated (step s26) thereafter.

The positions of the two ends of each of the other three scanlines may be computed in a similar manner. Once all eight sets of co-ordinates for those endpoints have been derived, the simple extrapolation can be performed to determine the positions of the four corners of the camera's field of view.

It will be appreciated by persons skilled in the art that various other forms of bar-code may be employed in implementing the invention, and that alternatively display patterns (e.g. glyph codes) other than bar-codes may be used in the position determination.

Thus, a technique for calibration of an interactive desktop system is disclosed. While the present invention is described with respect to a preferred embodiment, it would be apparent to one skilled in the art to practice the present invention with other configurations. Such alternate embodiments would not cause departure from the spirit and scope of the present invention.

What is claimed is:

1. An interactive desktop system comprising:

a work surface;

means for displaying images in a first area on the work surface;

means for capturing images in a second area on the work surface; and calibration means, coupled to the displaying and capturing means, said calibration means for calibrating said second area with said first area, said calibration means comprising:

means for causing the display of coded information on the work surface;

means for causing the capture of said coded information; and means for determining the position of said second area relative to said first area based on said captured coded information.

2. The system according to claim 1 wherein the second area overlaps with the first area.

3. The system according to claim 1 wherein the second area lies entirely within the first area.

4. The system according to claim 1 wherein the means for causing the display of coded information comprises means for causing the display of the coded information in a first orientation, and then in a second orientation.

5. The system according to claim 4 wherein the means for causing the capture of said coded information comprises means for causing capture of said coded information after said information is displayed in said first orientation and after said information is displayed in said second orientation.

6. The system according to claim 4 wherein in the first orientation, the coded information is displayed extending horizontally, and in the second orientation the coded information is displayed extending vertically.

7. The system according to claim 6 wherein the means for causing the capture of said coded information comprises means for causing capture of said coded information after said information is displayed in said first orientation and after said information is displayed in said second orientation.

8. The system according to claim 7 wherein the coded information comprises glyph codes.

9. The system according to claim 7 wherein the coded information comprises a barcode.

10. The system according to claim 9 wherein the barcode comprises a series of bars, arranged in a plurality of groups.

11. The system according to claim 10 wherein the displaying means comprises a projector and the capturing means comprises a camera.

12. For an interactive desktop system comprising a displaying means and a capturing means, a method for calibrating said interactive desktop system to find a field of view for said capturing means comprising the steps of:

a) displaying an all white frame using said displaying means;

b) capturing said all white frame using said capturing means;

c) displaying first coded information on a first calibration frame using said displaying means, said first coded information having a vertical orientation;

d) capturing said first coded information in said first calibration frame using said capturing means;

e) displaying second coded information on a second calibration frame using said displaying means, said second coded information having a horizontal orientation;

f) capturing said second coded information in said second calibration frame using said capturing means;

g) determining said field of view by performing the substeps of:

g1) finding horizontal edges of said first coded information using said captured all white frame and said captured first calibration frame;

g2) finding vertical edges of said second coded information using said captured all white frame and said captured second calibration frame;

g3) finding corners of said field of view for said capturing means based on said horizontal edges and said vertical edges.

13. The method as recited in claim 12 wherein said first coded information and said second coded information are bar codes.

14. The method as recited in claim 12 wherein the displaying means comprises a projector and the capturing means comprises a camera.

* * * * *